Oct. 30, 1928.
P. H. COLEMAN
FLOAT BALL
Filed July 12, 1927
1,690,057
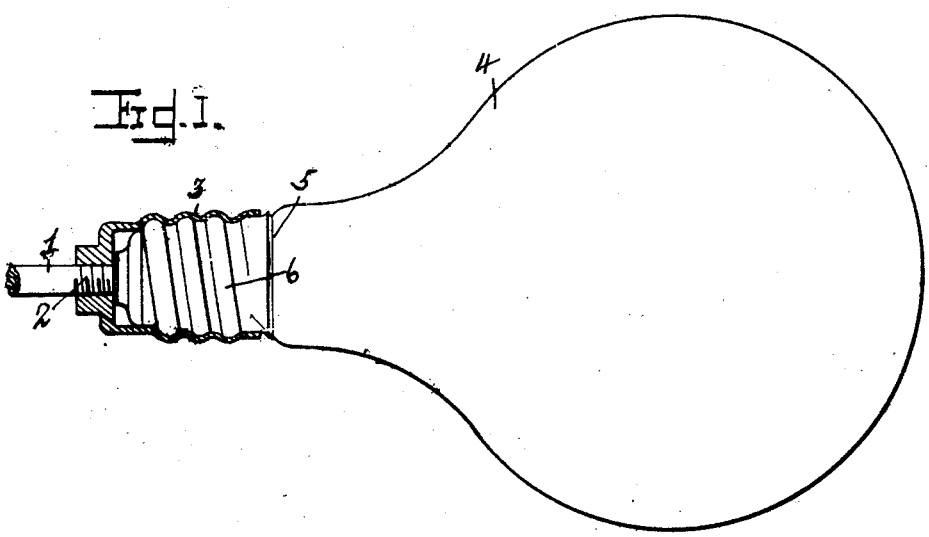
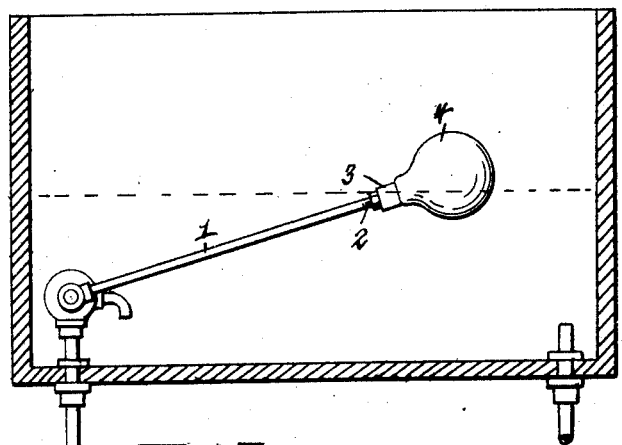
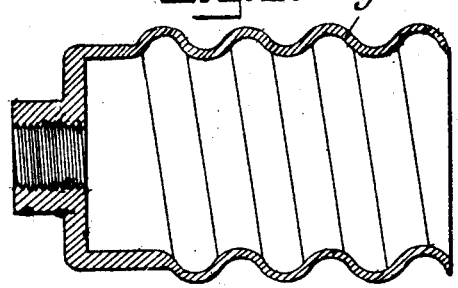
Paul H. Coleman
Inventor Patented Oct. 30, 1928.

1,690,057

UNITED STATES PATENT OFFICE.

PAUL H. COLEMAN, OF LYNCH, KENTUCKY.

FLOAT BALL.

Application filed July 12, 1927. Serial No. 205,144.

This invention relates to improvements in float balls for valve control, and has for its object to provide a glass float ball.

Another object of the invention is to provide a float ball having a screw and socket connection of a standard electric bulb type.

A still further object of the invention is to provide a float ball for flush tanks formed of a non-corrosive substance.

With the above and such other objects in view as may hereinafter more fully appear, I have invented the device illustrated in the accompanying drawings, in which:

Figure 1 is a sectional elevation of the improved device in connection with an electric light bulb operative as a float member;

Figure 2 is a section of a conventional flush tank including the intake valve, and float rod, with the improvement applied;

Figure 3 is an enlarged section of the improved device.

Like reference characters indicate like parts throughout the specification and in the several views in the drawings, in which 1 indicates a valve control float rod such as commonly used in flush tanks, the said rod being provided with a screw threaded end 2, upon which is threaded a socket 3 of the type commonly used in electric lighting fixtures. 4 is a hollow glass bulb or globe, from which the air has been pumped, creating a partial vacuum therein, and its stem 5 sealed and being provided with a screw cap 6 adapted to screw into the socket 3.

The rod 1 is the common lever forming part of the fixtures of a flush tank, and in using my device I unscrew the metal ball commonly used from the valve rod in such fixtures and screw the socket 3 upon the member 1, and then screw the bulb 4 into the socket 3. The ball 4 is usually the same diameter as the metal flush balls commonly used, and because of the vacuum created therein will have substantially the same buoyancy as the metal ball, and will have the same effect upon the stem 1. However, the fixture may be adjusted to adapt itself to any size of ball it is desired to use. A very material advantage of the above described invention over the devices now in use, is that the balls may be replaced with practically no cost as, should the original ball become broken or misplaced, any 100-watt burnt-out electric bulb may be substituted.

The improved ball will be made of standard sizes for all services, but for standard flush tank structures a burnt-out electric light globe will give absolute service, thus utilizing usefully an article that is usually thrown away.

Having now described my invention, that which I claim to be new, and desire to procure by Letters Patent, is:

1. In combination with a float rod having a threaded end, an internally threaded socket member threaded on said end, and a glass bulb having a threaded shank, and a screw cap on said shank adapted to be screwed into said socket.

2. In a device of the character described, in combination, a glass float bulb, said bulb having a partial vacuum created therein, said bulb having a screw shank, and a standard electric bulb socket in which said shank screws, and a threaded float rod to which said socket is threaded.

In testimony whereof I affix my signature.

PAUL H. COLEMAN.